United States Patent
Delhoune et al.

(10) Patent No.: US 6,956,667 B2
(45) Date of Patent: Oct. 18, 2005

(54) PAGE COMPOSING METHOD USING STORED PAGE ELEMENTS AND APPARATUS FOR USING THE SAME

(75) Inventors: Marc Delhoune, Boortmeerbeek (BE); Veerle Dieltjens, Berlaar (BE); Dominique Suys, Edegem (BE); Roger Baeten, Boortmeerbeek (BE)

(73) Assignees: Agfa Gevaert N. V., Mortsel (BE); Xeikon N.V., Mortsel (BE)

( * ) Notice: Subject to any disclaimer, the term of this patent is extended or adjusted under 35 U.S.C. 154(b) by 897 days.

(21) Appl. No.: 09/748,681

(22) Filed: Dec. 22, 2000

(65) Prior Publication Data

US 2002/0178950 A1 Dec. 5, 2002

Related U.S. Application Data

(60) Provisional application No. 60/179,172, filed on Jan. 31, 2000.

(30) Foreign Application Priority Data

Mar. 10, 2000 (EP) .......................................... 992045952

(51) Int. Cl.[7] ............................................. G06K 15/00
(52) U.S. Cl. ...................................... 358/1.18; 382/217
(58) Field of Search ............................... 358/1.18, 1.16, 358/1.17, 465, 471; 382/209, 217, 218, 219

(56) References Cited

U.S. PATENT DOCUMENTS 5,377,330 A    12/1994  Kubota et al.
5,463,771 A  * 10/1995  Sotoyanagi et al. ...... 707/104.1
6,363,168 B1 *  3/2002  Kakuma ..................... 382/151

FOREIGN PATENT DOCUMENTS

WO        WO 99/24933    *  5/1999   .......... G06K/15/02

* cited by examiner

*Primary Examiner*—Jerome Grant, II
(74) *Attorney, Agent, or Firm*—Edward L. Kelley; Robert A. Sabourin

(57) ABSTRACT

The invention relates to a method and apparatus for merging page elements according to a layout signal into one page for reproduction on a reproduction device. The page elements are segmented into smaller area tiles before storage stored into memory. Data from the page elements includes metadata describing the position into the memory of the sub-elements of the page element. Due to the used format for the page elements, data needed during merging can be retrieved, decompressed an processed quickly so merging can be done in real time during printing. The format used for the area tiles enables easy and fast execution of various image operations such as mirroring, rotation, etc . . .

Complexity data can be incorporated into the page element data, giving information about the amount of processing required to execute the merging.

13 Claims, 9 Drawing Sheets

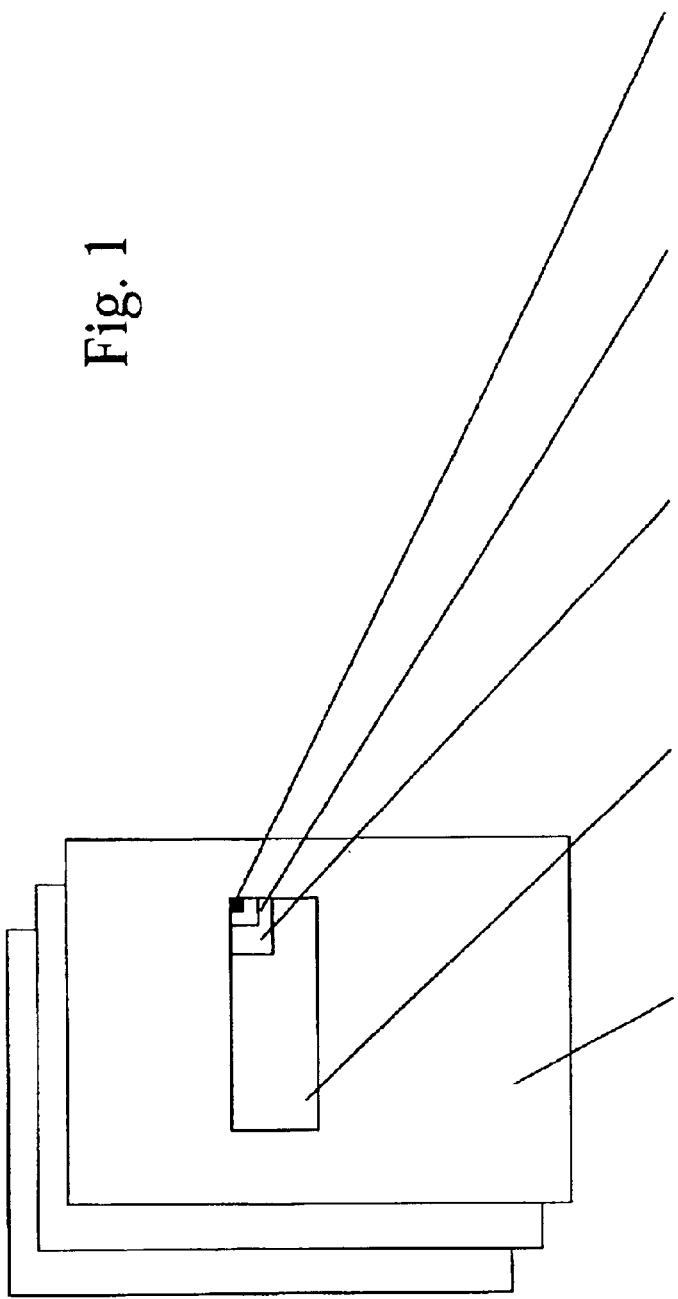

LOOK NOW
Fig. 5a
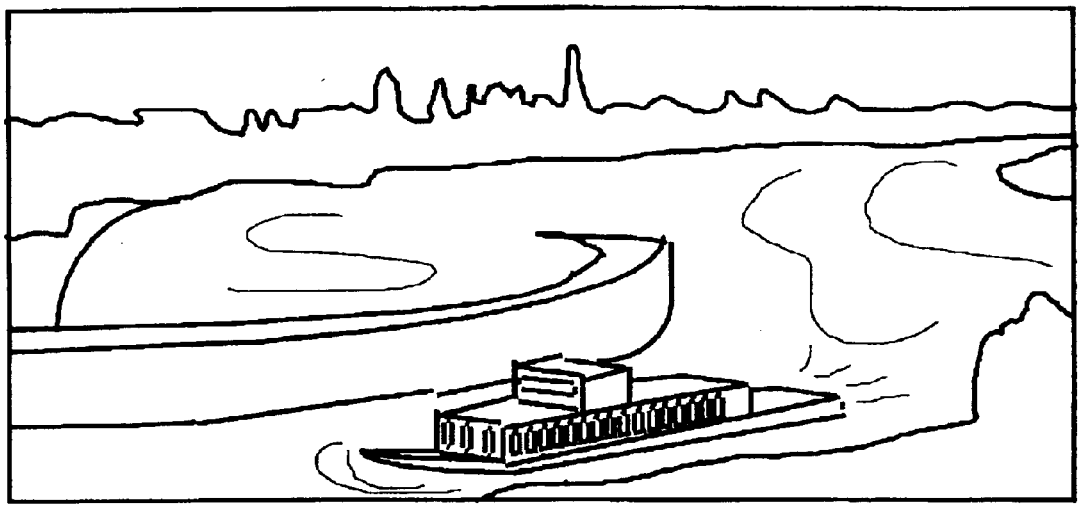
Fig. 5b
Fig. 5c
Fig. 5d

PAGE COMPOSING METHOD USING STORED PAGE ELEMENTS AND APPARATUS FOR USING THE SAME

This application claims priority to U.S. provisional patent application No. 60/179,172 filed on Jan. 31, 2000.

FIELD OF THE INVENTION

The present invention relates to a method and apparatus for composing an image signal.

More specifically the invention is related to a method for merging several page elements in real-time into one composite page signal which may be delivered to a printing engine.

BACKGROUND OF THE INVENTION

Several systems are known to deliver printing data to the printing engine of a digital printing system. The problem is that the system has to apply a method which is capable of delivering data at the speed of the printing system.

One such method is described in the international patent application WO-A-99/24933, herein incorporated by reference in its entirety for background information only. This document relates to the merging of compressed raster images in a printing system capable of printing pages containing variable information with unrestricted variability from page to page. Each page is constructed of several page elements which are processed by the raster image processor (RIP) in advance and which are stored in a compressed format in a page element cache. These page elements are merged into one page according to the page layout script data. This merging is done while the page elements remain mainly in compressed format. The compressed raster image of the complete page is then delivered to the printer where it is processed by a decompression and screening system which delivers data to the printing device. The method described in WO-A-99/24933 has however certain drawbacks. The continuous tone ("CT") data is compressed using a block based compression method (e.g. JPEG 8×8, a compression standard of the Joint Photographic Experts Group). In order to make rapid merging of two continuous tone page elements possible, the merging has to occur along CT coding block boundaries. Thus the placing of these blocks has to meet certain criteria or the blocks of one of the page elements are translated in order to obtain an exact overlap of the blocks of the two continuous tone page elements. Such an adjustment can be done while keeping exact registering of the boundaries of the different page elements because the locations of the boundaries are stored independently of the image content of the page elements, but the image of the page element is also translated which can cause problems when the images of two continuous tone page elements need to be in exact registration. In a 300 pixel per inch system (12 pixels/mm) using 8×8 JPEG coding this can lead to shifts of ⅓ mm which can give rise to visible distortions when printing certain images. The merging in compressed format also requires that the page elements need to be compressed using just one algorithm. If different (JPEG) formats are used then it may be necessary that the boundary blocks of the CT page elements have to be decompressed, merged and compressed again. When merging elements by superposition of blocks having transparent elements, the blocks have to be decompressed before merging. This implies the need for high processing power. The image information of these blocks is compressed twice, leading to extra loss of image quality.

Also other drawbacks of the known methods exist. It is difficult to merge two different page elements having a different resolution. When a single page element is required at two different locations and orientations on the same page, enough memory space has to be available to store the different copies of the page elements in e.g. different orientation.

OBJECTS OF THE INVENTION

It is an object of the present invention to provide a method for merging several page elements and delivering page printing data to the printing engine in a digital printing system avoiding the drawbacks of the methods known so far.

It is a further object of the invention to provide a method enabling merging and delivering data in real-time.

It is another object of the invention to provide a file format enabling easy merging of page elements.

It is a further object of the invention to provide an easy method for enabling the use of various compression methods and resolutions.

It a another object of the invention to provide a method for storing neighbouring pixels as closely together as possible on disk to enable fast retrieval.

It is a further object of the invention to provide a method enabling a variety of image operations (rotation, clipping, merging, translation . . . ) without previous computation or for storing the same page element twice.

It is a further object of the inventions to provide a method enabling fast hardware as well as software decompression and other image processing.

Further advantages and embodiments of the present invention will become apparent from the following description and drawings.

SUMMARY OF THE INVENTION

The above mentioned objects are realised by a method having the specific features set out in claim 1. Specific features for preferred embodiments of the invention are set out in the dependent claims. An apparatus suitable for using the method according to the invention is also described herein and claimed in subsequent claims.

Hereinafter the different terms used in the description and claims to define the invention are explained in relation to FIG. 1.

An image reproduction 10 is a reproduction of the image to be produced. This image can include continuous tone image data as well as text or graphics. The image reproduction 10 may be a physical reproduction printed out by a printing apparatus such as a digital printing apparatus. The image reproduction 10 can also be displayed as an image on a screen. The image reproduction 10 may also take the form of an electronic reproduction such as a file representing the image and which can be used for further processing. An example of such an electronic reproduction is a file stored in a "tagged image file format" (TIFF File).

An image signal is a signal provided to a printer, display device or other means. The image signal contains information necessary to display or print the image reproduction 10. This image signal can take the form of a complete static file though it is also possible it is a continuous dynamic stream of data from the processing apparatus to the printer. It may be possible that the complete file does never exist as a whole, because the data signals describing the start of the page may already have been processed or printed and deleted while the signals for the bottom of the page are not yet composed. The signal can take any form. It can be a digital signal or an analog signal, an electric signal as well as a modulated radio-signal or an infrared signal.

A file 10' contains data necessary to compose the image signal, it normally consists of one or more page elements 11' which each hold data for a portion 11 of the image reproduction 10. It is possible that layout data, determining placement and orientation of the image portions 11 is present within the file 11'.

A book file is a file containing only layout data necessary to print the job. This file gives references to one or more other files holding the data of the page elements 11' and it holds data about placement and orientation of these page elements 11'.

A page element 11' is a file or a portion of a file or a data structure containing data representing a image portion 11 of the image reproduction 10 to be reproduced.

Layout data is data or a data structure describing the composition and layout of the image reproduction 10. This may comprise the position of image portions 11 represented by the page elements 11' within the image reproduction 10, orientation or an imposition scheme of the page elements. The layout data may be comprised in a separate layout signal or book file containing these data or the layout data may be included as a layout signal into the files holding the data of the required page elements.

An area tile 12' is a portion of a page element 11' and contains data representative of a region 12 of an image portion 11. Such a region 12 is a subdivision, preferable a partition, of an image portion 11. A partition of a set is a plurality of disjunctive subsets, with the provision in that the union of all the subsets is the set. Disjunctive means that the intersection of each subset with all the others is empty. This area tile 12' contains all the information necessary for the reproduction of the region 12 of the image portion 11. The term "autonomic" area tile 12' is used because no data from other area tiles 12' is needed to reproduce the region 12 of the image portion 11 described. Position data representative for a position of the region 12 within said image portion 11 is preferably included within the page element 11' itself.

An image tile 13' is a portion of an area tile 12' containing data representative of a sub-region 13 of an image portion 11. Such a sub-region 13 is a subdivision of a region 12 of an image portion 11.

An image block 14' is a portion of am image tile 13' representative for a sub-portion 14 of a sub-region 13 of an image portion 11. Such a sub portion 14 is a subdivision of a sub-region 13 of an image portion 11.

The linear size of an object e.g. an image portion 11 or sub-portion 14 of a sub-region 13 is defined as the diameter of the smallest circle enveloping the object. FIG. 2a shows an example defining the linear size of a rectangular object. FIG. 2b gives an example for an irregularly shaped object. The above definition of linear size for a, possibly irregular, form of an object is not restrictive and only provides a reproducible definition for a linear size of a two dimensional object independent of the form of the perimeter of the object.

BRIEF DESCRIPTION OF THE DRAWINGS

FIG. 1 shows the relation of the data structures to the physical representation of the data in the reproduction

FIGS. 5a to 5d depict a graphical representation of page elements used in the described example.

DETAILED DESCRIPTION OF THE INVENTION

A specific method according to the invention will be described below in relation with an apparatus designed to operate according to the invention.

Figure 3:
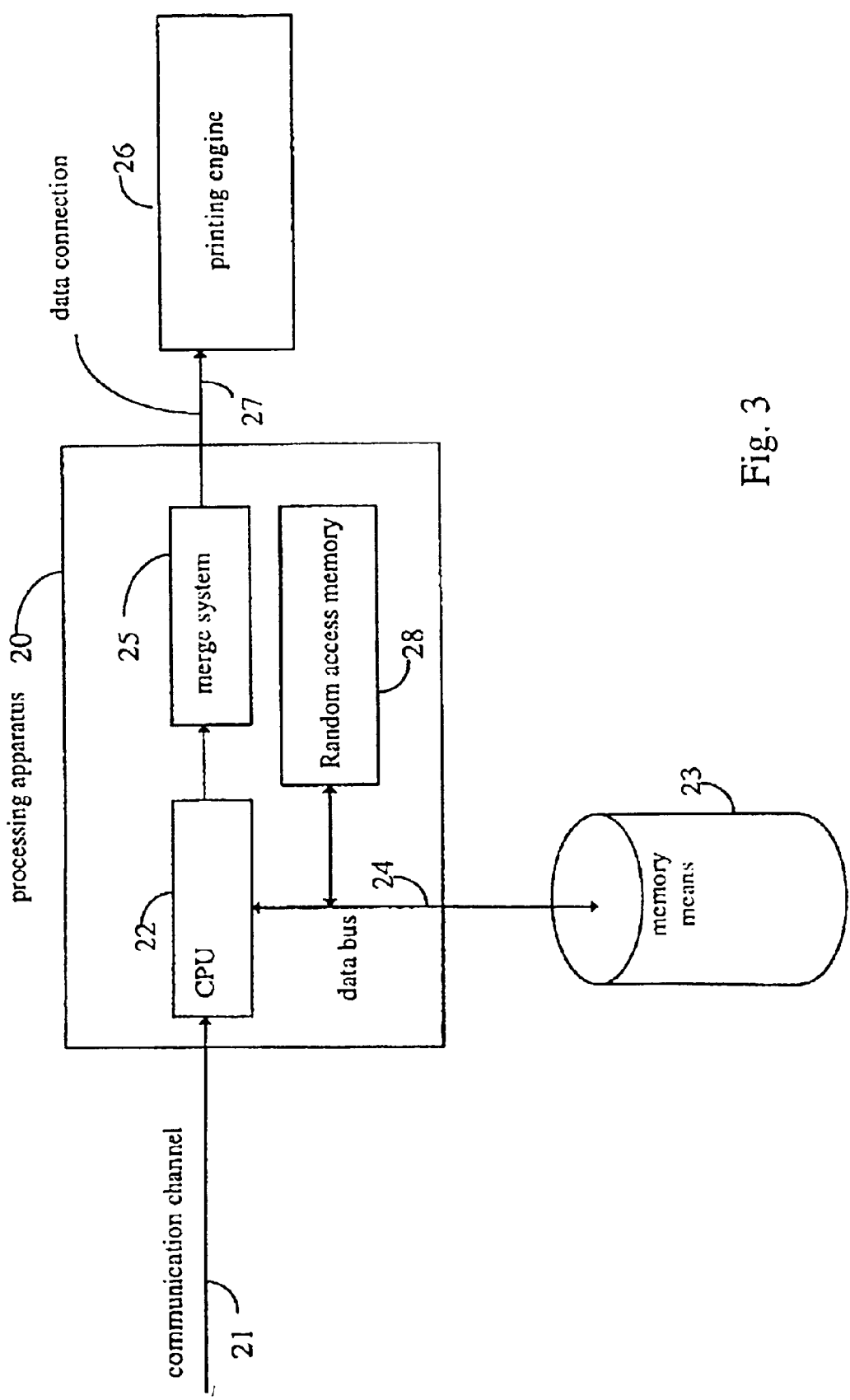
FIG. 3 shows a typical configuration of a processing apparatus for carrying out the invention

FIG. 3 depicts an apparatus for generating an image signal out of several page elements 11'. Signals containing the page elements 11' may be fed to the processing apparatus 20 via a communication channel 21. The data are fed to the processing unit (CPU) 22. This CPU 22 is coupled to a memory means 23, preferably outside the processing apparatus 20, via a data bus 24. Beside the memory means 23 there is also provided a random access memory 28 for allowing storage of e.g. area tiles 12' in a quick accessible medium. Once e.g. an area tile 12' is loaded into the random access memory 28, image blocks 14' of the area tile 12' can be accessed quickly therefrom. The CPU 22 is further coupled to a merge system 25 preferably inside the processing apparatus 20. The merge system 25 can comprise for example a Field Programmable Gate Array (FPGA) and delivers the page signal to the printing engine 26 via the data connection 27. A typical memory means 23 is a magnetic storage disk but other types of memory means can be used.

The complete printing job may be stored in one or more files 10', possibly accompanied by a book file. The files 10' holding all necessary instructions and data for executing the printing job, thereby generating the image signals required for the image reproduction 10. For each page in the job the page can be described by:

layout data including a list of references to the required page elements 11' for composing the page, data representative for the relative position of the image portions 11 on the image reproduction 10, i.e. placement in relation with the starting point of the page and optionally the orientation of the image portion 11 in relation to the page and page element imposition scheme within the page i.e. the order of placement, which includes which page element is located above another when portions of the elements occupy the same location. The information about the orientation preferably contains information of orthogonal rotations, i.e. rotation of the page element at integer multiples of right angles (0, 90, 180 or 270 degrees) and mirroring together with a rotation at 0, 90, 180 or 270 degrees. Also other information can be included As an example information about a preferably rectangular clipping path can be added. A clipping path is a closed curve overlaying an image portion 11 and enclosing an area to which the reproduction of the image portion 11 is to be restricted. A rectangular clipping path may be identified by the co-ordinates (x,y) of two points (x1,y1), (x2,y2) representing e.g. the upper left and lower right corners of the rectangle.

When no layout data book file containing layout data is given, the file containing the page elements may provide information serving as layout data.

The various page elements 11' required for printing an image reproduction 10 can be grouped within one or more files 10'. The required page elements 11' are preferably stored in a specific file format on a memory means 23 after the page elements 11' have been converted to that specific file format. It is possible that the 30 required page elements 11' are delivered in a file already converted into the specific format. In this case conversion is already done in advance.

Figure 4:
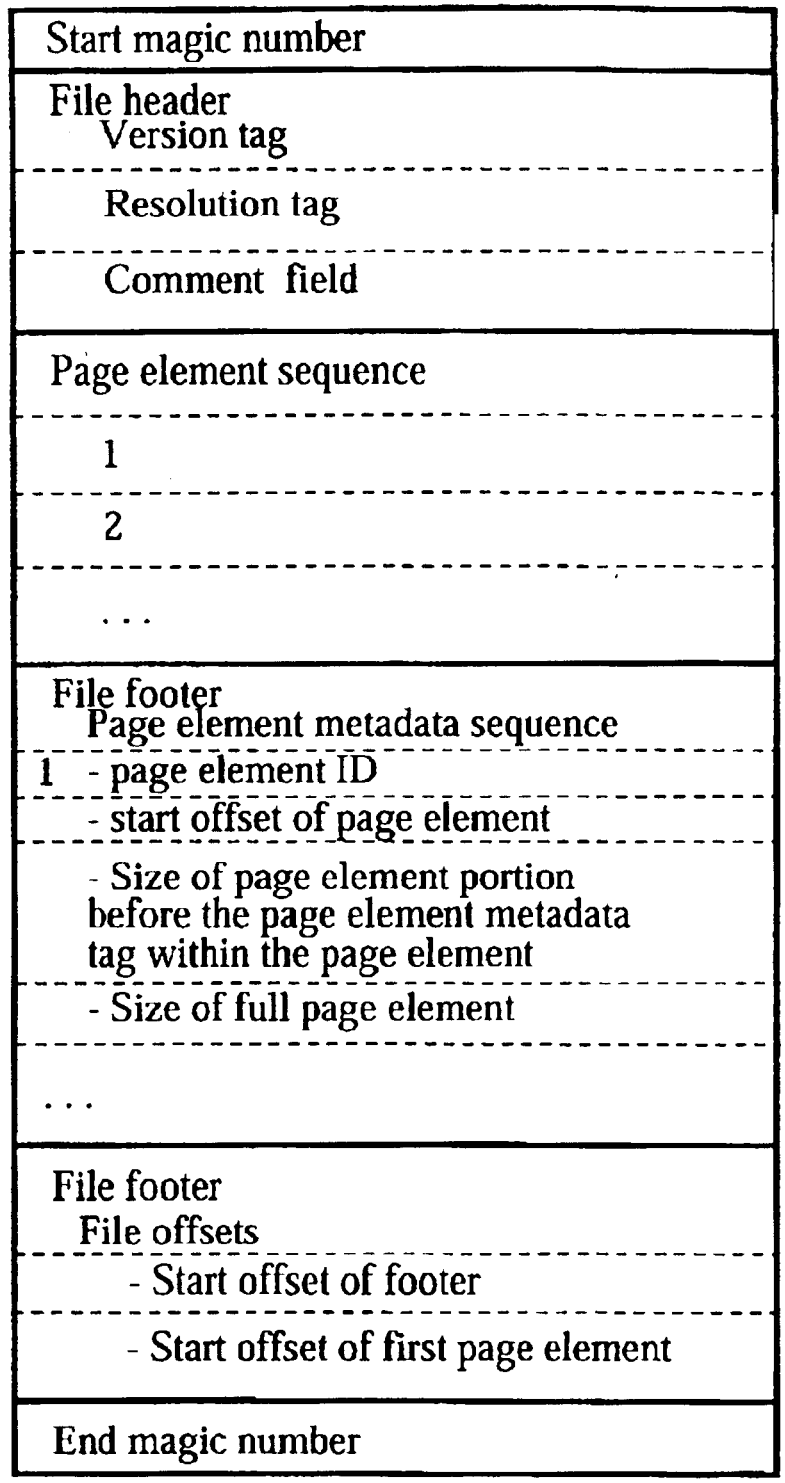
FIG. 4 shows a typical data structure for a page element 11'.

As shown in FIG. 4, in a preferred embodiment, such a file 10' having a specific format, may typically comprise:

A start magic number e.g. 4 bytes indicating the start of the file. The number is typical for the used file format.

A file header containing following data:
  version tag and data information about the version of the file format
  resolution tag and data containing the resolution code of the page elements 11'. The resolution of the page elements ill can be e.g. 300 dpi (12 dots per mm), 600 dpi (24 dots per mm) or other integer sub-multiples of 600 dpi for a 600 dpi (24 dots per mm) printer.
  optionally a comment tag and data containing character comment or a number identifying the file can be included to give human-readable information when the file is opened.

A sequence of page elements 11' in the file 10' containing all the data of the page elements 11' stored in a special format.

A file footer mainly holding data needed to locate the address of page elements 11' within the image file 10'. Beside a tag, a data field containing metadata for each page element may be present to contain for each page element the following fields:
  A page element identifier (ID) which is a unique identification of the page element 11' within the file,
  Start offset of page element 11', representative for the position of the memory location of the start of the data of the page element 11',
  Size of the portion of page element 11' located before the page element metadata tag, i.e. number of memory locations occupied by the page element image data before the metadata tag.
  Number of memory locations occupied by the complete page element 11', i.e. size of the full page element 11'.

The file footer may also contain a tag indicating the end of the file together with a data field containing:
  Start offset data of first page element 11', offset data of the memory location of the start of the data of the first page element
  A magic number serving as a marker for indicating the end of the file.

The page elements 11' and layout data may be stored separately from each other. The page elements 11' in the page element sequence of the file 10' have preferably rasterised data, representative for at least one image portion 11 of the image reproduction 10. Rasterised data represent an image by using a two dimensional array of pixels. Each pixel represents a small portion of the total image. The array is preferably compressed by a compression method such as JPEG, CCITT, etc . . . CCITT is a compression standard of the ComitéConsultatif International Télephonique et Télégraphique.

In order to obtain the special format of the page elements, the different page elements are first read and ripped if necessary to obtain rasterised image data by the central processing unit 22. Page elements 11' can be offered initially to the processing apparatus 20 via communication channel 21 in various formats. Some of the possible formats are:
  Text files in combination with various fonts,
  Vector oriented drawings, such as lines, circle segments, arcs, Bezier curves, filled trapezoids, etc.
  Continuous tone imagery, etc . . .

During ripping to obtain rasterised image data, input data for page elements 11' is interpreted and converted to bitmap data i.e. rasterised data. Text files are combined with the appropriate font data and also converted to bitmap data. Also other object descriptions having various file formats can be decoded and converted to bitmap data. This may be done by the central processing unit 22. The result is a bitmap for each page element 11'. A bitmap is typically a two-dimensional array of pixels. Each pixel represents a small square or rectangular portion of an image portion 11. In grey images, each pixel may be represented by one value e.g. in the range of 0–255. In colour images, each pixel is typically represented by three or more colour components. For each colour component of each pixel a value is required. In a system with three colour components, where each colour pixel value is represented by 8 bits, each colour pixel may take 256 different values for each component. Consequently each pixel may take $256^3$=16,777,216 possible values.

Besides the three colour values, extra bitmap values can be calculated for the black colour component. After ripping each page element 11' is thus described as rasterised data representative for an image portion 11.

According to the invention the ripped page elements 11' are segmented after ripping and decomposed by the CPU 22 in smaller units for each colour and stored in the memory means preferably according to a hierarchical order. The page elements 11' will be stored in this format as to enable them to be used at different locations and orientations within the pages without the need for ripping the elements a second time. This requires less processing power and reduces the required amount of memory of the memory means 23. The same page element 11' can also be used at different locations in the image reproduction 10 to be printed. Preferably the page elements 11' are delivered in a file format wherein they have been ripped and segmented in advance, so the page elements can directly be stored in the memory means 23.

Hereinafter a format for storage of the page element 11' which can be used in the invention is described. The different levels of the hierarchical order are described for the preferred embodiment beginning with the smallest building block of the image.

IMAGE BLOC LEVEL

The smallest element in the stored page element 11' is an image block 14'.

In a preferred embodiment an image block 14' contains the data of a square area 14 of 64×64 pixels. In the described embodiment for a printing engine 26 operating at a spatial resolution of 600 dots per inch (600 dpi corresponding to a resolution of 24 dots/mm), the image block 14' is representing a sub-portion 14 of a sub-region 13. The image block 14' therefore typically contains data for a square area of 0.27cm×0.27cm of the image reproduction 10. The size is preferably the largest block that can be manipulated by the hardware or optionally by software used for composing the image signal. This small size of the image block 14' enables rapid rotation or mirroring of the image block 14' and therefore the whole page element 11' can be rapidly manipulated. The image block 14' typically has a following structure:

Image block header containing a compression format code which indicates which compression format is used for the image block 14'. This code may be stored in a memory location having the length of one byte.

Image data which can be in compressed format. The structure of the compressed data depends on the compression format used. For image blocks 14' multiple formats can be supported for e.g. cases in which the compressed data size would be unacceptably large. For this reason various prediction schemes can be used. The content of the data may be continuous tone or line work data. Data of empty image blocks 14' can be omitted. However, an indication of these empty image blocks 14' is preferably stored.

Also other information can be incorporated into the image block 14'. For specialised printing jobs new channels for various uses can be added e.g. transparency gradations, image gloss value . . .

Information about the placement and orientation of the image block 14' may be incorporated into the description of the page element 11'. Preferably also the offset of the memory location for the data in the image block 14' is stored. This enables a rapid accessing of the image block data in an order needed to compose the image signal. Several sequences for accessing a set of image blocks 14' can be used to compose the image signal dependent upon the used algorithm for assembling the image reproduction 10. These offset data can be incorporated at various levels in the page element description.

In the most preferred embodiment several image blocks 14' are assembled into one image tile 13'.

IMAGE TILE LEVEL

According to the most preferred embodiment an image tile 13' is the smallest block that will be manipulated by the software. It is composed of image blocks 14' and provides a block of reasonable size to work with when performing block based operations in software. It is also an aid to minimise metadata, such as e.g. the offset of the memory locations of the image blocks 14', about the image blocks 14'. An image tile 13' represents a sub-region 13 of an image portion 11 located on the image reproduction 10.

In the preferred embodiment the image tile 13' contains a square matrix of 4×4 image blocks 14', what means that its size is 256×256 pixels. At 600 dpi (24 dots/mm) this corresponds to a square area of 1.08 cm×1.08 cm on the image reproduction 10.

The image tile structure 13' comprises typically the following data structures:

An image block sequence: This is preferably simply a sequence of image blocks 14' in the image tile 13'. In a preferred embodiment empty image blocks 14' are omitted from the sequence.

Image block Metadata: This data structure contains a tag and a data field containing information about the offset of the data of the image blocks 14'. This data field holds position data representative for the (relative) position in the memory of the image block data 14' within the image tile 13' in the memory means 23. This allows for easy retrieval of the image block data 14'. In the preferred embodiment for each of the 16 image blocks 14' an offset value of two bytes is stored. As can be calculated in an image tile 13' a total of (4×4)×(64×64)=65,536 pixels are present. The offset value for each image block 14' can point to a corresponding memory location used for storing the image tile 13'.

In the most preferred embodiment several image tiles 13' are combined into one area tile 12'. Preferably, offsets are stored to indicate the (relative) position in the memory where the data for an image block 14' starts. Empty image blocks 14' may be indicated by inserting an offset which equals zero. Likewise, it is preferred that memory offsets are stored for the start of an image tile 13' and empty image tiles 13' can be omitted when a offset value of 0 is given for these image tiles 13'.

AREA TILE LEVEL

According to the most preferred embodiment the area tiles 12' are the typical building blocks of the page elements 11'. When the page elements 11' are stored by the CPU 22 in the memory means 23, they are segmented into these area tiles 12' which each contain data representative of a region of the image portion 12. In the preferred embodiment the area tile 12' is composed of a square matrix of 8×8 image tiles 13' and contains (8×8)×(256×256)=4,194,304 pixels which, for a printing system operating an 600 dpi (24 dots/mm), represents a square area of 8.67 cm×8.67 cm of the image reproduction 10.

These area tiles 12' are in a format allowing easy reproduction of the area tile 12' without the use of data of other area tiles 12'. This also relates to the term "autonomic" area tile 12'. In some other storing methods using e.g. JPEG compression, data from a previous area tile 12' is needed to reconstruct the data of the next area tile 12'. This may lead to excessive processing effort for reconstruction the area tile 12', especially when the page element 11' is to be rotated, mirrored, etc . . . Hereinafter an example of a format of such an autonomic area tile 12' used in the described embodiment is given:

The area tile data may comprise:

An area tile tag and data field comprising a colour separation code.

The sequence of the image tiles 13' within the area tile 12'. Empty image tiles 13' can be omitted from the image tile sequence or indicated by inserting an offset which equals zero.

Image tile metadata: this may comprises a tag code and a data field having data for each image tile 13' in the area tile 12'. This data field may contain for each image tile:
transparency data indicating whether the image tile 13' is fully opaque or not.

Image tile metadata offset, i.e. offset of the memory location where the image tile metadata can be found. Optionally other fields can be included into the area tile:

Complexity data of the image blocks'14', representative for the amount of processing effort needed to process the area tile 12' data of the page element 11'. This field enables to make estimations about the complexity of a printing job. It typically contains a 1-byte code per image block 14' in the area tile 12', saying how good or how bad the image block's compression has been done. With this aid it is possible to calculate for a given printing engine 26 whether it is possible to do the necessary calculations to compose the image signal within the required time interval for delivery to the printing engine 26. The signal has to be timely available when the printing engine 26 prints the job. No interruptions in the delivery of the image signal are allowed while the printing engine 26 is running. Using the complexity data it is possible to calculate in advance whether the printing job using the "book file" can be printed on the printing engine 26 in real time i.e. whether the processing apparatus 20 is capable of delivering data at the speed of the printing engine. When the processing power of the processing apparatus 20 is too low to keep up with the speed of the printing engine 26, certain calculations may have to be made in advance in order to diminish the amount of calculations needed when the job is executed in real time. Also information whether the image blocks 14' are totally transparent, totally opaque, or partially transparent may be included.

In order to indicate the end of the area tile 12' and for data integrity reasons a CRC (cyclic redundancy check) footer is preferably added. The CRC code may be is computed based upon all the data written in the area tile 12'.

AREA TILE MEMORY LOCATION.

When composing the image signal from the area tiles 12' of the different page elements 11', the image reproduction 10 is composed from top to bottom. Composition of the image signal is done by processing the different area tiles 12' as they are needed. A detailed system for composing the signal will be described later on.

In any case all the data of one area tile 12' have to be easily accessible. A particular advantage can be obtained when the data of an area tile 12' are stored in the memory means 23 at contiguous locations such that retrieval of the data of an area tile 12' can be done very fast. When using a magnetic disk, the memory locations for storing complete area tiles 12' are preferably chosen as to make sure that the reading mechanism has to perform a minimum of mechanical movements so less time is consumed in reading data from disk. This can be done by storing the data in sectors where each sector comes directly after the previous. To obtain this storing of the data in contiguous memory locations, it is important to have optimum memory management. Fragmentation of the data is to be largely avoided. This gives an important advantage when the processing of the page elements 11' is to be done in real time i.e. while the printing engine 26 is running. Especially hard disk reading mechanisms are relatively slow and when data is stored at unfavourable memory locations a large amount of time is consumed while waiting for the mechanical parts to move to places where the data is to be read from the memory means 23, especially when data is scattered around at different locations of the disk. This threatens the continuance of the data stream to the printing engine 26. Also for other memory means 23 using different storing methods a good choice of memory locations for storing one area tile 12' can make a difference relating to the speed of retrieval of the area tile data 12'.

It can be seen that an area tile 12' does not only represent a region 12 of an image portion 11 on the image reproduction 10 but can preferably also be related to a (physical) area in the memory means 23.

Also for other types of memory a favourable way of storing can be is found. Using solid state memory modules such as conventional random accessible memory, it can be avoided that retrieved data has to be extensively processed to obtain the required data in the right order. Memory management is very important.

Preferably the different area tiles 12' are stored in the memory means 23 in the order they are needed for composing the image signal. This even ensures faster retrieval and faster overall processing.

AREA TILE GEOMETRY AND LINEAR SIZE

In a preferred embodiment image blocks 14' or image tiles 13' or area tiles 12' represent an image subdivision having a square geometry. In a more preferred embodiment all sub-elements i.e. image blocks 14', image tiles 13' and area tiles 12' all represent image subdivisions having a square geometry. A square geometry means that the number of pixels in a row equals to the number of lines in such a subdivision, e.g. 64×64; 256×256; 4096×4096. This is the most favourable case but other geometric forms can be used.

In other embodiments the page element 11' can be composed of rectangular image subdivisions, but also other forms such as triangles, diamond-like forms or even irregular forms are conceivable. It can be seen that for certain applications in image printing specific form are favourable; e.g. when printing packaging material intended for a package having the shape of a tetrahedron, specific forms of image portions 11 (page elements 11') and hence a specific shape of the region 12 of image portions 11 (area tiles 12') can be favourable.

The borders of the image regions 12 represented by the data of the area tiles 12' preferably exactly join with the border of the neighbouring regions 12 but this is also not necessary.

The linear size of the region 12 which is represented by the area tile 12' in relation to the linear size of the whole image portion 11 represented by the page element 11' may vary. In order to obtain a maximum advantage of the described method, the linear size of the image portions 11 (electronically represented by page elements 11') and the linear size of the regions 12 of image portions 11 (area tiles 12') best meet certain criteria. However defining these criteria for irregularly shaped regions may lead to different values for the criteria.

When defining the linear size as described above, in conjunction with FIGS. 2a–2d, the linear size of the image portion 11 represented by the page element 11' is the diameter of the smallest enveloping circle enveloping the image portion 11 represented by the page element 11' and the linear size of the region 12 of the image portion 11 represented by the area tile 12' is the diameter of the smallest enveloping circle enveloping this region 12 represented by the area tile 12', it is advantageous that twice the linear size of the image region 12 is smaller than or equal to the linear size of the image portion 11.

Figure 2A:
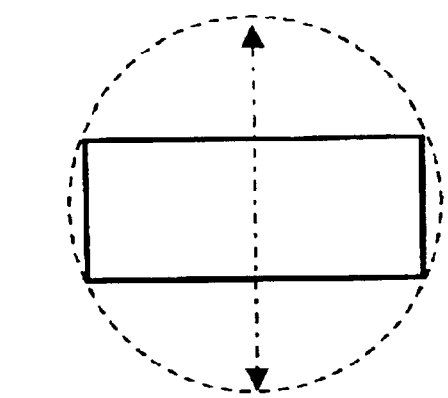
FIG. 2a illustrates the definition of linear size.
Figure 2B:
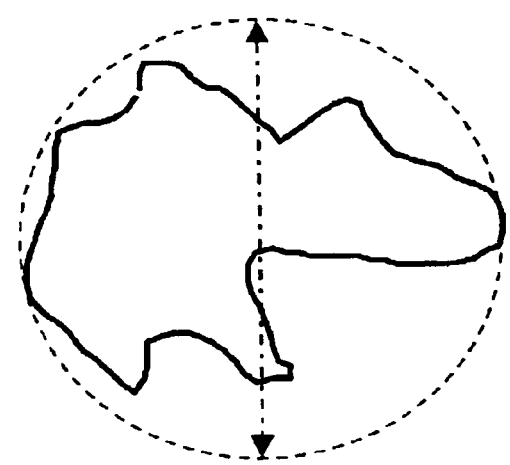
FIG. 2b illustrates the definition of linear size with an irregularly shaped object.
Figure 2C:
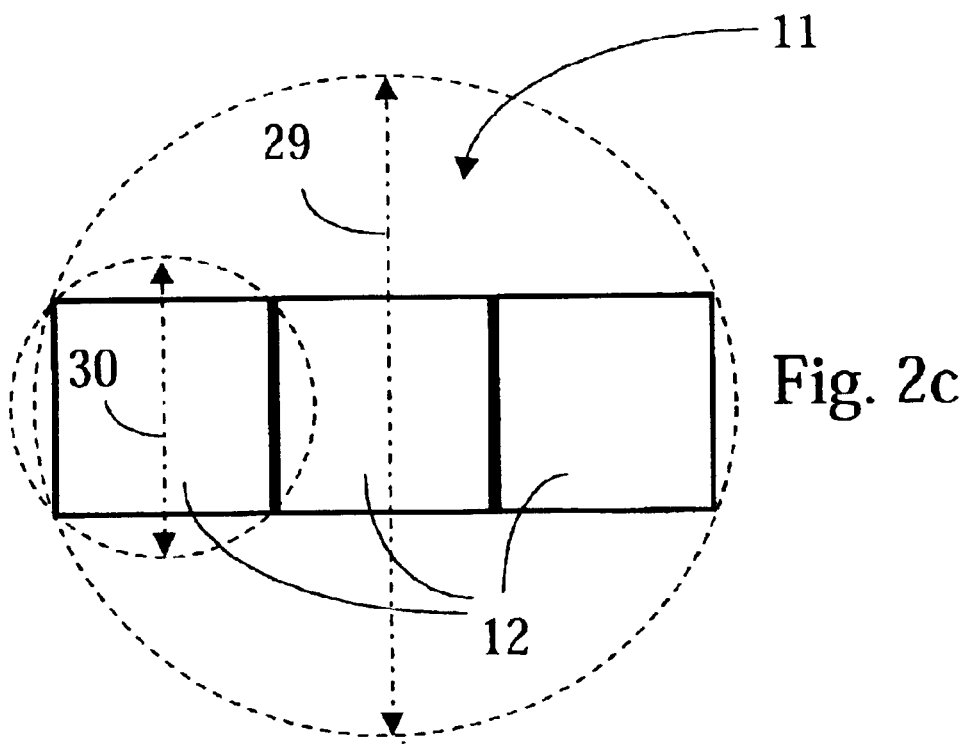
FIG. 2c illustrates the ratio of the linear size of an image portion 11 to the linear size of the regions 12 of the image portion.
Figure 2D:
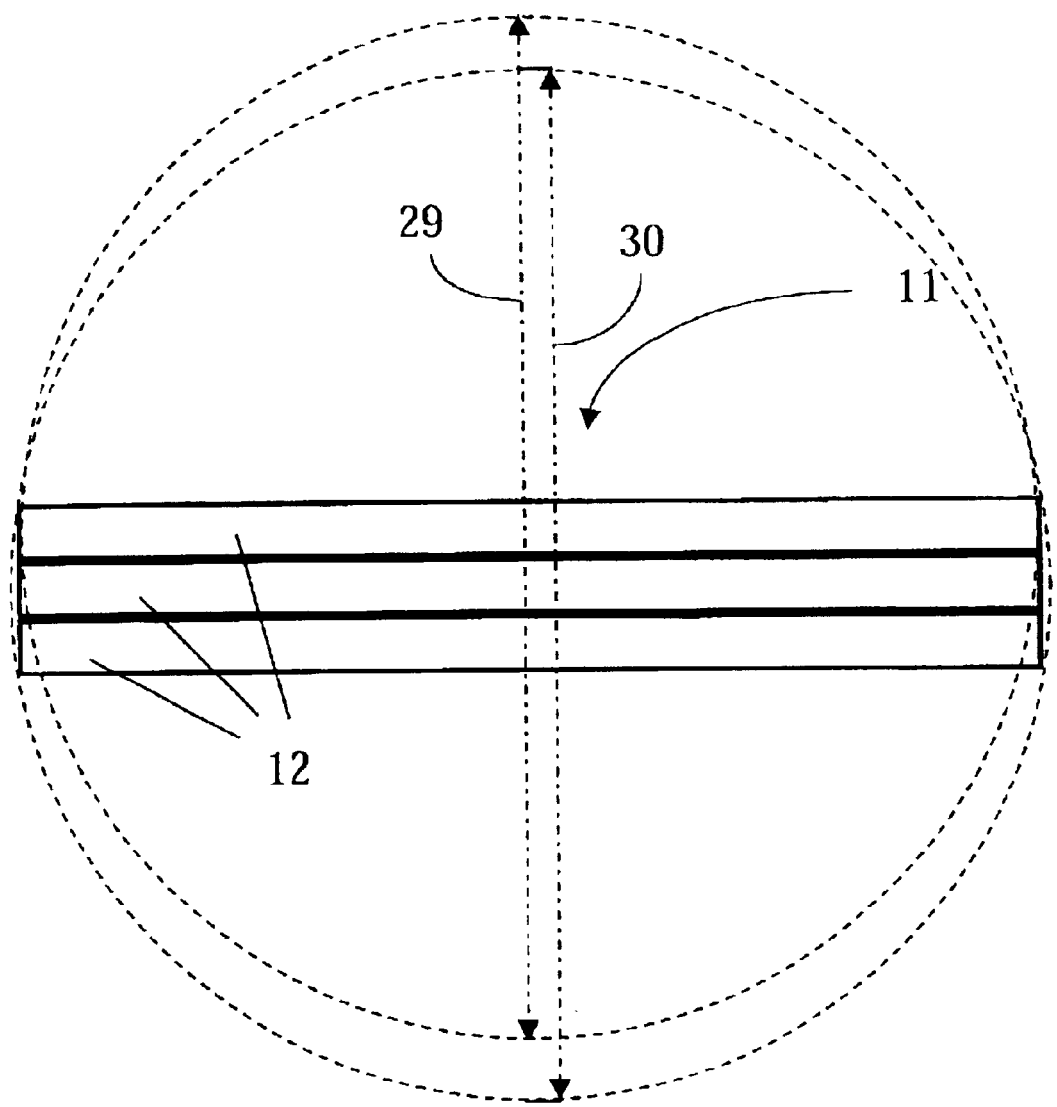
FIG. 2d illustrates the ratio of the linear size of an image portion 11 to the linear size of the regions 12 when using an unfavourable dividing method for segmenting the image portion 11.

FIG. 2c shows an example where one image portion 11 has three adjacent regions 12. The linear size 29 of the image portion 11 is indicated by axis line 29. The linear size 30 of the region 12 is indicated by axis line 30. Because the ratio of the linear size 30 of the region 12 and linear size of the image portion 11 meets the criteria, that $S_{30}/S_{29} \leq 0.5$, each region 12 represents a relative small and compact segment of the image portion 11. A less favourable example is given in FIG. 2d. Here the linear size 29 of the image portion 11 and the linear size 30 (shown somewhat translated in order to avoid overlap with 29) of the regions 12 representing the area tiles 12' do not meet the criteria and when processing the area tiles 12' it is clear that each region 12 is not restricted to a small portion of the image reproduction 10. As described later on this can lead to disadvantages when composing the image reproduction 10.

For the same reasons it is favourable that the linear size of the sub-regions 13 represented by the data of the image tiles 13' meet the same criteria, i.e. that the linear size of sub-region 13 is smaller than or equal to half the linear size of the region 12.

In a preferred embodiment, it is also advantageous that the ratio of the linear size of the sub-portions 14 and the linear size of the sub-regions 13 meet the same criteria, i.e. it is favourable that the linear size of the sub-portion 14 is smaller than or equal to half the linear size of the sub-region 13.

PAGE ELEMENT LEVEL

When preparing the printing job, a page element 11' is segmented into different autonomic area tiles 12'. Each area tile 12' has tile data representative for a region 12 of the image portion 11. This data is stored into the memory means 23. There is no limit on the maximum number of area tiles 12' within a page element 11'. A page element 11' is preferably completely self-contained and therefore can be drawn separately i.e. without using data from a neighbouring page element 11' or it can be extracted out of a file.

According to the most preferred embodiment, the datastructure of a page element 11' typically is as follows:

Page element tag indicating the start of a new page element 11'

A sequence of area tiles 12': This comprises the sequence of area tiles 12' in the page element 11'. Empty area tiles 12' can be omitted from the sequence.

Page element metadata tag indicating the start of the metadata

The metadata itself containing:
 Width of the page element 11' (in pixels)
 Height of the page element 11' (in pixels)
 Resolution code indicating resolution of the page element 11'
 Number of colour separations and the different colour separation codes.
 Area tile 12' metadata containing general information:
  Tag indicating start of area tile 12' metadata
  Transparency rectangle indicating which pixels of the area tile 12' are fully opaque. The rectangle is preferably described by x and y position of the upper left corner of the rectangle within the image portion 11 and the width and height of the rectangle.
  Value of the quality factors used for compression of e.g. JPEG compression.
  Number of different compression formats used and information about these compression formats.
 Next metadata about each individual area tile is listed containing
  Start offset of area tile 12', e.g. relative locations pointing to the start address of the memory location where the data of the area tile 12' starts. This offset is preferably zero if the area tile 12' is empty.
  Size of area tile 12' data occurring before the image tile metadata within the area tile 12'
  Full size of area tile 12' (CRC included)
 Other fields may contain metadata about position and clipping.
 Clipping data may comprise
  x position of the upper left corner of the clipping rectangle within the page element 11'(image portion 11)
  y position of the upper left corner of the clipping rectangle within the page element 11'(image portion 11)
  width (in pixels) of the clipping rectangle
  height (in pixels) of the clipping rectangle
  Orientation (0°, 90°, 180° or 270°) and mirroring data are optional. When no special position or clipping is necessary, the description can be simplified.

Other optional data fields can be included such as a Huffman table used for coding the page element 11'. Normally a standard Huffman table will be specified but a different table can be used for each page element 11'.

According to the method of the invention, the page elements 11' are segmented and stored in the memory means 23 as described above.

According to one embodiment, the page elements 11' are segmented into area tiles 12'. According to a preferred embodiment, the area tiles 12' are further segmented using at least one of the hierarchical levels described herein above Area tiles 12' are preferably further divided into a plurality of image tiles 13', each image tile 13' being representative for a sub-region 13 of the region 12 represented by the area tile 12'. In order to obtain rapid retrievability of the image tiles 13', offset data containing information about the location of the image tile data in the memory is included into the page element 11'. As described above in a preferred embodiment the offset data of the image tiles 13' is preferably stored at area tile level.

The image tiles 13' are preferably further divided into image blocks 14' representative for a sub-portion 14 of a sub-region 13.

One of the main advantages of a hierarchical structure for storing the image data, e.g. using page element 11', area tile 12', image tile 13' and image block 14' is that image data is rapidly retrievable. After an area tile 12' is loaded from the memory means 23 into the random access memory 28, the data of an image block 14' and the reproduction parameters of the image block 14' can be rapidly found retrieved from the random access memory 28 and brought together. This is done by using the metadata comprising the offset data included in the different hierarchical levels of the format. The retrieval of the image blocks 14' preferably should be possible in a random manner. This is a big advantage when composing the image signal. It is to be avoided that long series of image blocks 14' are to be read in order to obtain the data required to generate a specific portion 11 of the image reproduction 10. Certain compression methods (e.g. JPEG) rely for the reproduction of one image block 14' on information from other image blocks 14'. These data have thus to be accessed in a fixed order to allow the retrieval and reconstruction of the needed data. When a page element 11' is rotated of mirrored the order in which the blocks are needed can be totally different from the order in the compression sequence. This leads to retrieving and calculating large amounts of data which will eventually not be used.

The reproduction parameters of the image block 14' may be derived from the metadata gathered from the different hierarchical levels. Certain parameters are present as such in the file format. Others have to be derived or calculated from a combination of different metadata stored on page element 11', area tile 12', image tile 13' or image block 14' level.

These reproduction parameters may include:
 data compression method, such as run length encoding, JPEG, . . .
 gloss level
 clipping paths, preferably rectangular
 spatial resolution position of the sub-portion 14 of the sub-region 13 on the image reproduction 10 which can be calculated from the position and size data at different levels, combined with the layout data.

orientation of the image block 14' to be used.

transparency data, transparency gradation colour separation codes

Huffman code table

It is possible to store all the reproduction parameters at a single level. E.g. each image block 14' could have a metadata field comprising all the reproduction parameters for the block but this mostly leads to a high volume of data which is repeated for each block. This solution may require more memory space and thus involves a higher cost.

Another solution would be to include all the reproduction parameters for all the image blocks 14' into the metadata field of the page element 11'. This may lead to a large overhead for the computation of reproduction parameters in the page element file 10'.

An appropriate distribution of the reproduction parameters over the several hierarchical levels may diminish the amount of metadata or the processing requirements.

Various alternatives can be constructed based upon this hierarchical structure. It is possible to use only the area tile 12' level for segmenting the page element Ill and not divide the area tile 12' into lower level units. The image tile 13' level can be omitted from the page element 11' format. The size of the pixel-matrix of the different sub-elements 11', 12', 13', 14' can be chosen larger or smaller but normally the size will mainly depend on the design and construction of the processing apparatus 20. The form of the segments 11, 12, 13, 14 may be different from square, e.g. rectangular, rhombic, trapezoid, triangular, hexagonal, etc.

As mentioned above, the page elements 11' may be read and ripped by the CPU 22. The page elements 11' are preferably segmented into area tiles 12' which are preferably further divided into image tiles 13' and the image tiles 12' preferably are segmented into image blocks 14'. It is also possible that the page elements 11' are already delivered to the processing apparatus 20 in the desired format as described. When all the page elements 11', required for printing an image reproduction 10, are rasterised, segmented and stored in the memory means 23, the generation of the image signal can be started. All data required for composing the image signal is preferably read from the memory means 23 and stored to the random access memory 28 to allow quick access. According to the information of the layout data, the data of the required page elements 11' are retrieved from the memory and placed into a buffer to generate the image signal for the image reproduction 10. Data retrieval can be done out of the random access memory 28 or out of the memory means 23, or even out of a combination of both.

Composition of the image reproduction 10 may be done in a progressive manner. Composition is started at the top of the page. This signal is to be delivered first to the printing engine 26. As mentioned above, composed page data for the image reproduction 10 is not directly sent to the printing engine 26 but is stored in a memory buffer capable of storing at least a portion of the composite image for printing. This buffer may be provided for each colour (yellow, magenta, cyan, black) and for other printing stations in the printer (e.g. colourless transparent glossy toner in an electrographic printer). Also other toners or inks having special properties can be used. When printing on a duplex printer, buffers are provided for each side of the page. The processing algorithm described herein below may be used for every printing colour or extra printing station.

This processing for each colour can be done simultaneously or one colour after another. As it may be too expensive to provide a buffer for the whole page, the buffer is preferably sized so that it is capable of taking a portion of the page in the buffer memory collecting the data to be sent to the printer.

The placement of the page elements 11' can be done in various ways.

Hereinafter an example is described using a specific algorithm for the composition of a page comprising several overlapping page elements 11'.

In the description following definitions are used

Top of the page: this is the beginning of the page which is first composed (printed).

End of the page: the portion of the page which is composed (printed) last.

Objects lying closer to the top of the page are located at a lower ordinate Y than objects close to the end.

In a set of page elements 11', each page element 11' can be assigned to a different layer. The page elements 11' laying in an upper layer mask objects lying in bottom layers when occupying the same place on the page.

FIGS. 5a to 5d depict representations of four page elements 11' to be used for composing a page to be printed by the printing engine 26.

Page element A shown in FIG. 5a is a page element composed of a text, which is coded in run length coding, and a transparent background.

Page element B shown in FIG. 5b is a continuous tone JPEG code image which has to be printed in a rotated position.

Page element C shown in FIG. 5c is a text page element having text and a non-transparent background in full colour. For printing on the page a clipping path, having the shape of an arrow, is included to obtain the form of an arrow.

Page element D shown in FIG. 5d is a small text page element with transparent background.

Figure 6:
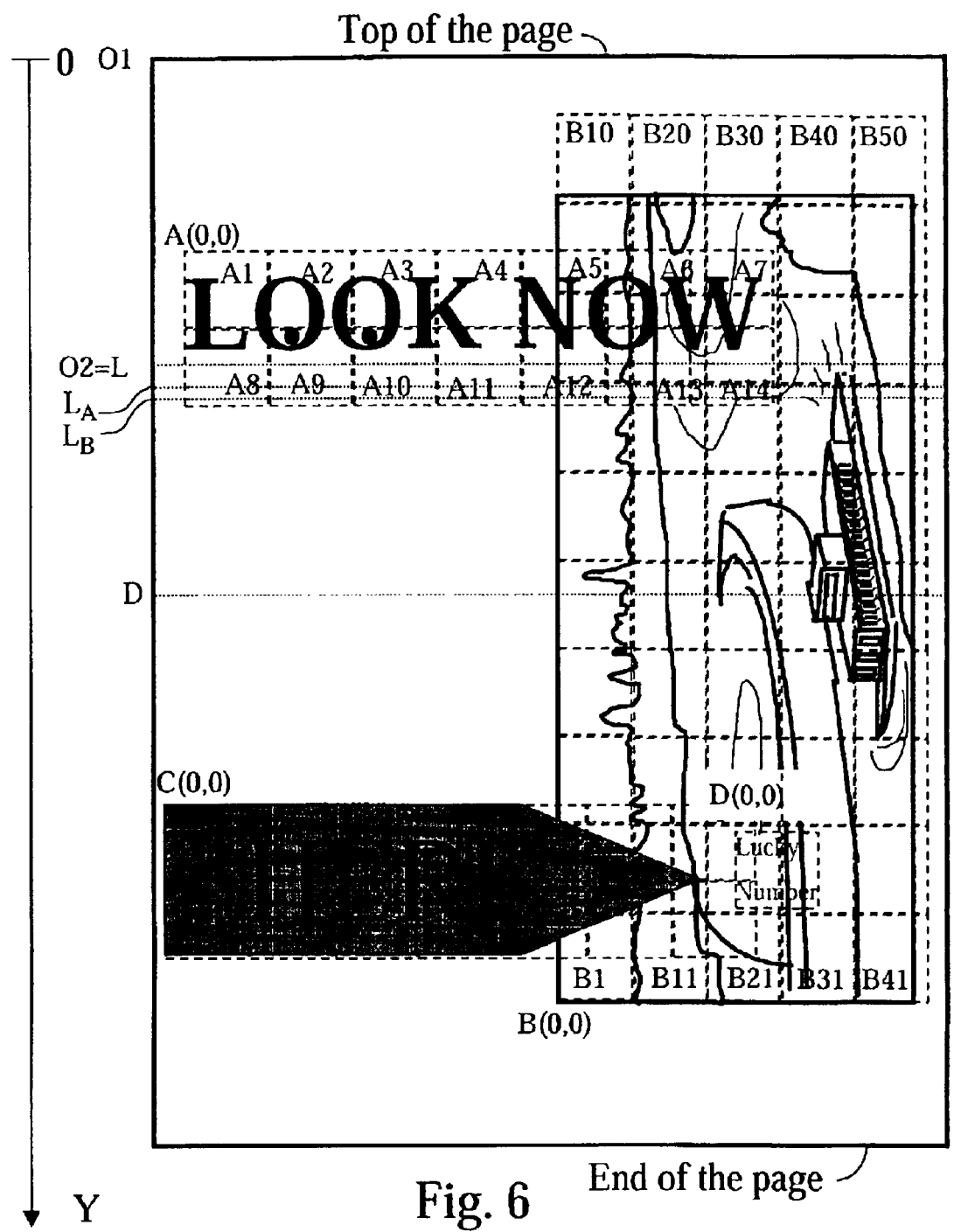
FIG. 6 shows the final image reproduction to be sent to the printer.

FIG. 6 represents an image of the desired output page. The segmentation into the regions 12 corresponding to the area tiles 12' is indicated using dashed lines.

The four page elements (A, B, C and D) are ripped by the CPU 22, segmented and stored in the memory means 23. Preferably the area tiles 12' of the page elements 11' are stored in the random access memory 28. A separate layout signal is provided, preferably stored in the random access memory 28, describing the page. In order to compose the page, first a band in which the image is to be composed is defined.

Figure 7:
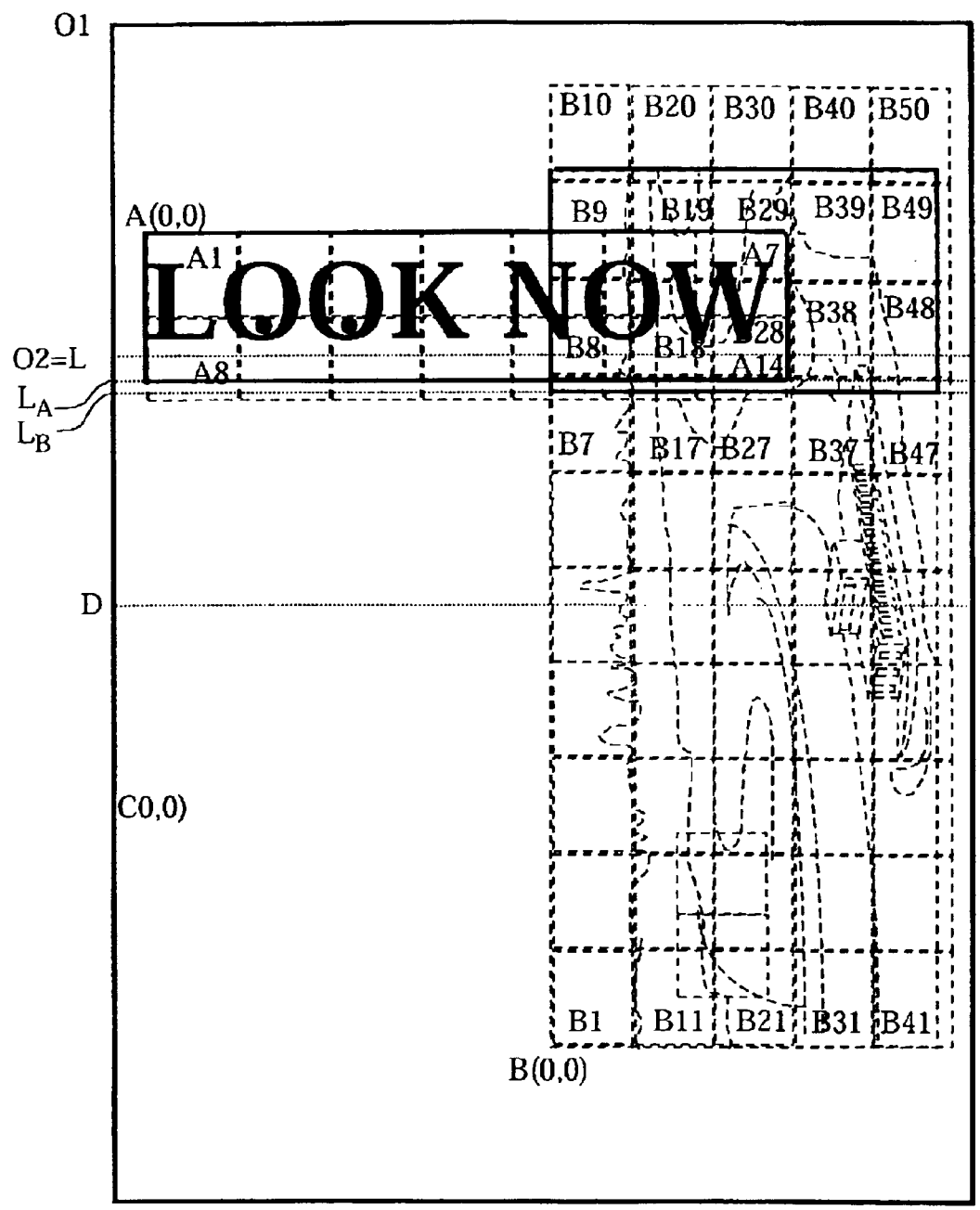
FIG. 7 shows a representation of partially drawn page elements when printing a first band.
Figure 8:
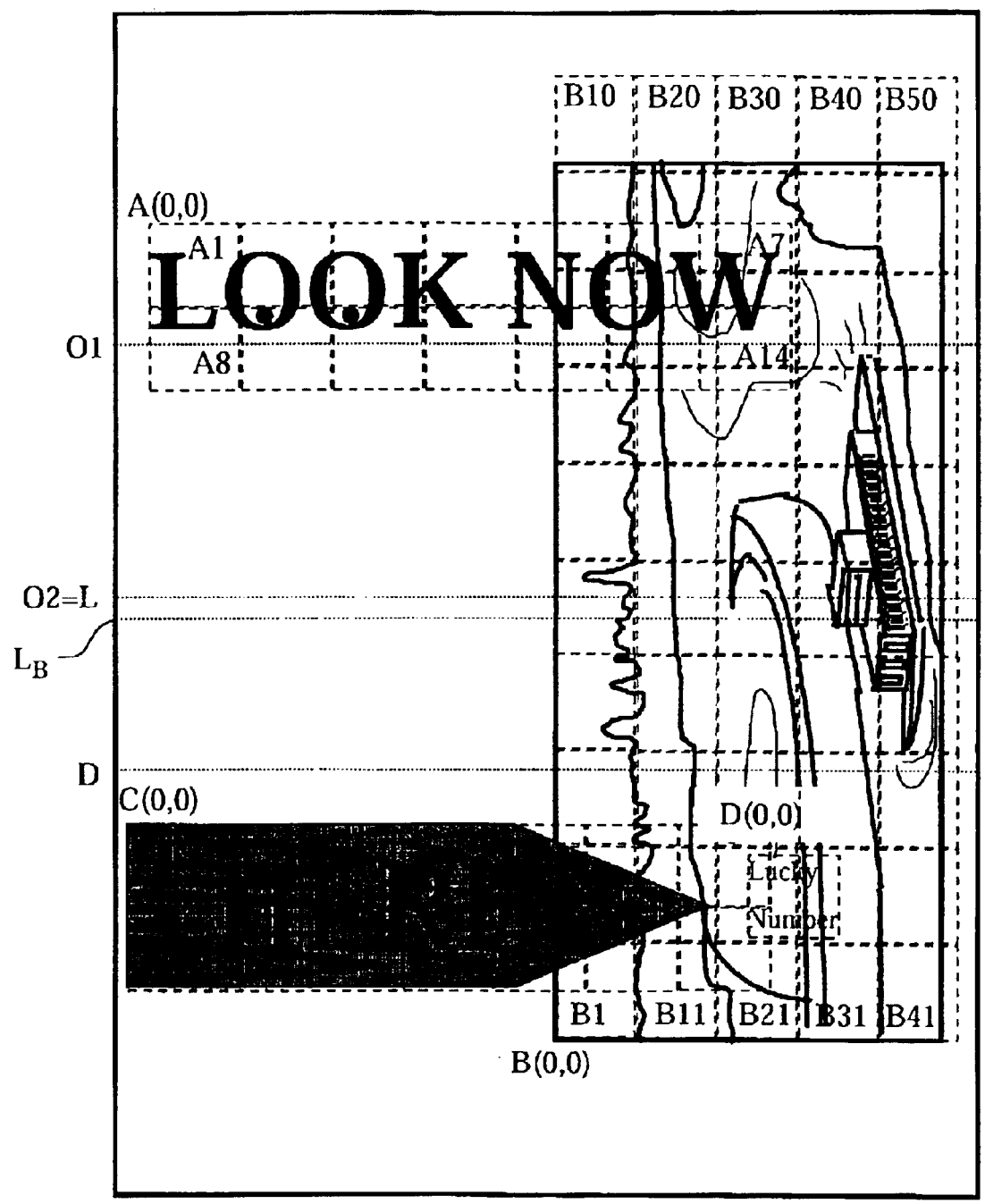
FIG. 8 shows the location of a second band to be printed.

The following description is given referring to FIG. 6 to FIG. 8. First a general description is giving for the selection of the page elements, afterwards the method is described for the present example.

The page elements 11' are ordered from the upper layer to the bottom layer, i.e. an order is made wherein the page elements 11' overlying the other are ordered before page elements 11' lying at the bottom.

A band, starting at offset O1 and ending at offset O2, is defined, where O2>O1. In FIG. 6 the band O1–O2 is situated at the top of the page. Because the buffer is not capable to store the whole page, there is a limit to the length of band that can be stored. This limit is called deadline and lies at offset D where D>O2. The values of the offsets O1,O2 and of the deadline D may vary according to the size of the available memory buffer, processing capacity and other system variables (disk speed, data bus capacity, . . . )

A list of SPE (selected page elements 11') is made of page elements 11' which are necessary for printing this band. These selected page elements 11' are selected from a list PE of the required page elements 11' for printing the page. Each selected page element 11' is associated with a drawing limit $Lspe_x$ indicating to what extent the page element will be drawn. This is done by following steps:

First a drawing limit L is set to O2. This is the limit indicating to which extent page elements 11' will be drawn. The value L is representative for the distance from the top of the page to the limit to where the page element 11' will be drawn.

For every single page element 11' $pe_x$ of the page, required for printing the page, which all are ordered in the list PE in descending order (upper layer page elements 11' are handled first), following procedure is executed:

1. Set the drawing limit for the page element $pe_x$ to L
2. For every single already selected page elements $spe_x$ in the list SPE of selected page elements it is checked whether $spe_x$ overlays $pe_x$ of the list PE. If $spe_x$ overlays $pe_x$ in the region between O1 and L, compare the drawing limit $Lspe_x$ with the drawing limit of $pe_x$ and set L to the highest value.
3. If $pe_x$ has a portion to be drawn between O1 and L, add $pe_x$ to the list SPE. This condition can be determined by considering the origin of the page element 11', the desired orientation and size. The drawing limit of this page element 11' will be set to L, but padded to the end of an image block 14' (Sub-portion 14 of a sub-region 13) obtaining a drawing limit $Lspe_x$ for the newly selected page element 11'. This means that the drawing limit of the page element 11' is set higher in order to coincide with the edge of a row of image blocks 14'.
4. For the following page elements the same steps are taken using the newly obtained L from the previous step.

The drawing limit can never exceed the deadline D. The case when drawing limits coincide with the value of D is described further below.

For the example in the described embodiment the drawing limit is first set to L which is equal to O2.

The list PE of page elements comprises in descending order from upper layer to bottom layer PE=(C,D,A,B). The order of these elements is determined by the layout data containing the layout scheme.

For this band, start with an empty list SPE. Thus SPE=().

Page elements C and D do not overlap with the band O1-L and therefore are not selected during the third step when executing the procedure described above. The first page element 11' to be considered when going through the list of ordered page elements PE, is A.

Since SPE is empty there are no overlaying page elements 11' in the list SPE of selected page elements, the value of L need not to change.

As A has a portion to be drawn in the band O1-O2, page element A is added to the empty list SPE of selected page elements. Thus SPE=(A). The drawing limit L for this page element 11' is simply padded to the end of an image block. This is indicated in FIG. 6 by LA. LA is now the drawing limit of page element A. The image sub-portions 14 corresponding to image blocks 14' are not shown because their dimensions are too small to be drawn clearly.

When considering page element B, the last page element 11' in the sequence PE=(C,D,A,B), it is found that A in the list SPE=(A) overlaps with element B and that A has a higher drawing limit LA than the initial drawing limit L of element B. Therefore the drawing limit L is set to LA.

Page element B has a portion to be drawn between O1 and L and is added to the list SPE, such that SPE=(A,B).

The drawing limit L for page element B is padded to the end of an image block of B thus obtaining a drawing limit LB, as shown in FIG. 6. Therefore the drawing limit LB of the bottom element B is higher than the drawing limit LA of element A.

After the generation of the list SPE list is completed and all the drawing limits of the image portions 11 corresponding to the page elements 11' in the list SPE are defined, the list of selected page elements SPE=(A,B) is backwards accessed, i.e. first B and then A.

First the data of the image blocks 14' of the selected page elements 11' lying in the bottom layer and which have not yet been written to the buffer during generation of the signal of a previous band, if the band which is being processed is not the first, are accessed and written to the buffer. Accessing the image blocks 14' is preferably done in an order based upon information contained within the layout data. By using the metadata at the different segmentation levels and the layout data, it is possible to rapidly access the data and reproduction parameters in a favourable order, and if needed, decompress, translate, rotate or mirror the accessed image blocks 14' and place them in the buffer memory at the right location in the short available time. This can be done by using dedicated hardware for these functions. An other possible solution is to use a processor with adapted software. All this has to be done quickly as the printing engine 26 is running and the stream of data has to be continuous.

In general, after the bottom layer page elements 11', the upper layers, possibly containing overlaying page elements 11', of the band are retrieved and written to the buffer. Image blocks, of the band to be processed, already written to the buffer during formation of a previous band, need not to be reprocessed and written. As explained below these blocks are included in the starter left over from the previous band. When writing into memory locations of the buffer, already occupied by page elements 11' laying closer to the bottom layer, the data already in the buffer are simply overwritten. This causes not problems as the overlaying page element is always written after the bottom layers.

Because the drawing limit (e.g. $L_B$) of the underlying page elements is always higher than the drawing limit of the overlying page elements (e.g. $L_B$) it is not possible that data of the underlying page elements is written at memory locations where data of overlying page elements is already written.

In the current example, first the required image blocks 14' of page element B are accessed, the JPEG coding is decompressed and the result is quickly rotated by the hardware and is written to the buffer at the desired memory locations. This rotation and other transformations can be done fast because of the hierarchical segmentation of the page elements 11' and the linear size characteristics of the regions 12.

It is also not necessary to access the image blocks 14' of one layer in a specific order. Due to the hierarchical segmentation, a placement of the image blocks 14' in a random order is possible.

The image blocks 14' can also be put at random in the correct locations in the buffer. The positioning of underlying image blocks 14' has no influence on the placement of the image blocks 14' of an upper level. As mentioned above, a favourable order for accessing the image blocks 14' may exist depending upon the layout data of the page element 11'.

It is also possible to merge page elements 11' with an underlying bitmap or completely ripped page already in the memory buffer.

In the current example the area tiles B8, B9, B10, B18, B19, B20, B28, B29, B30, B38, B39, B40, B48, B49 and B50 (see FIG. 7) can be accessed and stored in the buffer completely with all their image blocks 14'. As a large area of are tiles B10, B20, B30, B40 and B50 is empty, there will be only a small amount of data needed to write these area tiles 12' in the buffer. Not all of the image blocks 14' of area tiles B7, B17, B27, B37 and B47 (FIG. 7) have to be drawn because these area tiles 12' are divided by the drawing limit $L_B$. After completion of the bottom layer containing B, having the JPEG coded picture, the image blocks 14' of page element A are accessed, the run length coding is decompressed and the data is written to the buffer memory.

Area tiles A1–A4 and A8–A11 (indicated in FIG. 6) are written into blank memory locations. The image blocks 14' of area tiles A5–A7 and A12–A14 (partially) overwrite memory locations already occupied by page element B. As the background of element A is transparent, the image from page element B is not completely overwritten. Only the solid text replaces the image data of the picture B in the output buffer. Area tiles A8 to A14 are not put into the buffer completely as they are divided by drawing limit $L_A$. The finished result of the first band is indicated by the solid line rectangles in FIG. 7. As the bottom layer image blocks of page element B are drawn first to a higher drawing limit $L_B$ it is impossible that later drawn image blocks of the overlaying area tiles 11' of page element A will be overwritten by the image blocks 14' of page element B. When a first band is finished, all the page elements 11' no longer needed can be deleted from the list PE containing all the page elements 11'. In the example page element A can not be omitted from the list PE=(C,D,A,B) as area tiles A8 to A14 are not written completely to the buffer. If a page element 11' is completely written to the buffer, but if it is needed further on in the page, it is kept also in the list PE. The page elements 11' written in the memory means can be reused at other locations as they are stored in an orientation invariant format.

When the whole band is completed for all the colours of the image, the data for the band between O1 and O2 can be sent from the buffer to the printing engine 26. As the different drawing limits of the page elements 11' may exceed O2, several image blocks lying in the band between O2 and the highest $Lspe_x$ are already drawn. This portion between O2 and $Lspe_x$ is kept as a starter for the next band. After completion of the processing of the first band, a following band is defined and the procedure is repeated for this band. The processing of the following band has to be completed before all the data of the image of the first band has been sent completely to the printing engine 26. In this way a continuous stream of data to the printing engine 26 can be guaranteed. In relation to the current example the new offset O1 is set to the old O2 and a new O2 and deadline D are defined as shown in FIG. 8. The initial drawing limit L is set to the new O2 as shown in FIG. 8. Again a list SPE=(A,B) is composed. B is the page element to be placed at the bottom layer. A is considered first. As the drawing limit L exceeds the location occupied by A, the remaining portion of this page element 11' can be written to the buffer completely. For page element B a new drawing limit $L_B$ is set padded to the end of image blocks 14' as indicated in FIG. 8. First the image blocks 14' of bottom layer element B are written to the desired locations in the buffer. Only the image blocks 14' which have not been processed in the previous step need to be accessed. Afterwards the image blocks 14' of element A which have not yet been processed in the previous step are accessed, processed and are written over the memory positions of the bottom layer image blocks 14' of page element B. Afterwards page element A can be omitted from the list of page elements PE=(C,D,A,B) to be drawn, giving now PE=(C,D,B).

In the lower portion of the example page, a clipping path shaped as an arrow was imposed on the rectangular page element C. While retrieving the page element C and writing it to the buffer, preferably only data within the arrow-like clipping path is written to the buffer.

When, due to multiple page elements 11' overlapping each other, the drawing limit L reaches the deadline D, it sometimes is, due to a lack of available memory locations in the buffer, impossible to pad the drawing limit to the end of an image block 14'. Image blocks 14' lying across the deadline D can only be drawn partially. These blocks 14' which are drawn incompletely receive a special marker. When printing the following band, the image blocks 14' have to be partially redrawn.

When determining the order for retrieving the image blocks 14' of the different page elements 11' for composing the image signal, it is also possible to take into account the complexity data present within the page elements 11'. As well the data on compression ratio as the date indicating transparency can herein be used.

If a page element 11' has a large amount of data, it is possible to introduce an extra level in the hierarchical segmentation of the page elements 11'. The page element 11' can be divided into several page tiles. These page tiles contain area tiles 12' having all the necessary data for independent reproduction. These page tiles can also be used when merging two separate page elements 11' into one large page element. Each original page element 11 can serve as a page tile without excessive processing effort. It is one of the advantages of the used file format that it enables easy merging of several page elements into a bigger one.

It is clear that the term "page" used in this description is not limited to the known page sizes e.g. A4 (210 mm×29.7 mm). The page size can vary and take unusual proportions while there are virtually no restrictions to the number of page elements 11' on the page. As an example of an unusual page size it is noted that the digital press AGFA Chroma-Press can print pages up to 11 m in length. The Agfa ChromaPress is a duplex colour printer (cyan, magenta, yellow, black) having a resolution of 600 micro dots per inch (24 dots per mm) for producing 1000 A3 pages per hour. ChromaPress is a trademark of Agfa-Gevaert N. V. in Mortsel, Belgium.

As the output signal can also take an electronic form, the term "page" is not limited to a sheet of paper or hardcopy material.

In the preferred embodiment the obtained image signal is fed from the memory buffer for further processing by a screening algorithm. A screening algorithm is capable of transforming a continuous tone rasterised image to a binary halftone or multilevel halftone image, more suitable for printing. Afterwards the printer can print the image using the screened colour separations.

Having described in detail preferred embodiments of the current invention, it will now be apparent to those skilled in the art that numerous modifications can be made therein without departing from the scope of the invention as defined in the appending claims.

| Parts list | | |
|---|---|---|
| 10. | Image reproduction |
| 10'. | File |
| 11. | Image portion |
| 11'. | Page element |
| 12. | Region of image portion |
| 12'. | Area tile |
| 13. | Sub-region of image portion |
| 13'. | Image tile |
| 14. | Sub-portion of a sub-region of an image portion |
| 14'. | Image block |
| 20. | Processing apparatus |
| 21. | Communication channel |
| 22. | CPU (central processing unit) |
| 23. | Memory means |
| 24. | data bus |
| 25. | Merge system |
| 26. | Printing engine |
| 27. | Data connection |
| 28. | Random access memory |
| 29. | Linear size of image portion 11 |
| 30. | Linear size of region 12 |

What is claimed is:

1. Method for generating an image signal for an image reproduction from:
   at least one page element having data representative for at least one image portion of said image reproduction and
   a layout signal having layout data for defining at least one position of said image portion in said image reproduction, wherein said page element is segmented into a plurality of autonomic area tiles, each area tile having tile data representative for a region of said image portion, and wherein said tile data is stored in a memory means, comprising:
   retrieving from said memory means and merging said tile data according to said layout data for generating said image signal wherein said tile data is merged independent from neighboring, previously merged or overlapping tile data.

2. Method according to claim 1 wherein a linear size of said region is smaller than or equal to half a linear size of said image portion.

3. Method according to claim 1 wherein said page element includes offset data representative for the offset of the memory location of said area tile within said page element within the memory means.

4. Method according to claim 1 wherein said tile data is stored in said memory means at contiguous memory locations.

5. Method according to claim 1 further including decompressing said tile data.

6. Method according to claim 1 wherein said page element contains complexity data representative for an amount of processing effort needed to process said tile data of said page element.

7. Method according to claim 1 further comprising dividing at least one autonomic area tile, into a plurality of image tiles, each image tile representing a sub-region of said region represented by said area tile.

8. Method according to claim 7 wherein said page element includes offset data representative for the offset of the memory locations of data of said image tile within said area tile.

9. Method according to claim 7 wherein a linear size of said sub-region is smaller than or equal to halt the linear size of said region.

10. Method according to claim 7 further comprising:
    dividing an image tile into a plurality of image blocks, each image block having data representative for a sub-portion of said sub-region and said page element having data including reproduction parameters for said image blocks,
    accessing retrieved tile data by accessing said image blocks in an order based upon information of said layout data.

11. Method according to claim 10 wherein said page element includes offset data representative for the offset of the memory location of said image block data within said image tile.

12. Method according to claim 10 wherein a linear size of said sub-portion of said sub-region is smaller than or equal to half the linear size of said sub-region.

13. Image signal generating apparatus for an image reproduction comprising:
    a memory for storing:
        data of segmented page elements representative for at least one portion of said image reproduction and
        layout data defining at least one position of at least one image portion in said image reproduction, and
    a processing unit for:
        retrieving and merging said data of said segmented page elements independent from previously or underlying merged page elements in accordance with said layout data, and
        generating from said merged page elements said image signal for image reproduction.

* * * * *